(12) United States Patent
Continanza et al.

(10) Patent No.: US 11,887,087 B2
(45) Date of Patent: *Jan. 30, 2024

(54) SYSTEMS, METHODS, AND APPARATUSES FOR FACILITATING TRANSFERS BETWEEN USER COMMERCE ACCOUNTS ASSOCIATED WITH A MERCHANT OF A COMMERCE PLATFORM

(71) Applicant: Stripe, Inc., South San Francisco, CA (US)

(72) Inventors: Christopher Continanza, Berkeley, CA (US); Shreyas Surendra Doshi, Piedmont, CA (US); Brian David Krausz, San Francisco, CA (US); Jay Shah, San Francisco, CA (US)

(73) Assignee: STRIPE, INC., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,992

(22) Filed: Jan. 6, 2023

(65) Prior Publication Data

US 2023/0281582 A1 Sep. 7, 2023

Related U.S. Application Data

(63) Continuation of application No. 15/892,290, filed on Feb. 8, 2018, now Pat. No. 11,551,193.

(Continued)

(51) Int. Cl.
*G06Q 20/12* (2012.01)
*G06Q 20/08* (2012.01)
(Continued)

(52) U.S. Cl.
CPC ........... *G06Q 20/12* (2013.01); *G06Q 20/027* (2013.01); *G06Q 20/085* (2013.01); *G06Q 20/227* (2013.01); *G06Q 20/3676* (2013.01)

(58) Field of Classification Search
None
See application file for complete search history.

(56) References Cited

U.S. PATENT DOCUMENTS

| 7,726,561 B2 * | 6/2010 | Katyal | G06Q 20/04 |
| | | | 235/379 |
| 8,458,086 B2 * | 6/2013 | Bishop | G06Q 20/102 |
| | | | 705/40 |

(Continued)

*Primary Examiner* — Paul S Schwarzenberg
(74) *Attorney, Agent, or Firm* — Womble Bond Dickinson (US) LLP

(57) ABSTRACT

Disclosed embodiments provide systems, methods, and apparatuses for facilitating transfers between user commerce accounts associated with a merchant of a commerce platform within a computing environment supported by a processor and a memory to execute such functionality. An exemplary system may include a means for creating a merchant account platform at the payment system; creating a single charge from a customer at the merchant account platform; creating multiple transfers from the merchant account platform to different connected accounts, wherein the multiple transfers are to each transfer a sub-portion of proceeds associated with the single charge from the customer to each of the different connected accounts; performing the single charge from the customer to the merchant account platform; and performing each of the multiple transfers from the merchant account platform to the different connected accounts. Other embodiments are also disclosed.

14 Claims, 10 Drawing Sheets

Related U.S. Application Data

(60) Provisional application No. 62/456,564, filed on Feb. 8, 2017.

(51) Int. Cl.
*G06Q 20/02* (2012.01)
*G06Q 20/36* (2012.01)
*G06Q 20/22* (2012.01)

(56) References Cited

U.S. PATENT DOCUMENTS

| | | | |
|---|---|---|---|
| 8,700,525 B1* | 4/2014 | Rafferty | G06Q 20/10 705/42 |
| 9,805,385 B2* | 10/2017 | Soon-Shiong | G06Q 30/0222 |
| 2011/0106668 A1* | 5/2011 | Korosec | G06Q 30/04 705/40 |
| 2013/0117185 A1* | 5/2013 | Collison | G06Q 20/3829 705/67 |
| 2022/0261772 A1* | 8/2022 | Miyamoto | G06Q 20/10 |

* cited by examiner

Platform 210

Create a Charge 206

Charge syntax:

```
Create a Charge:
curl https://api.stripe.com/v1/charges \
    -u sk_test_BQoZykGUvBcI2HpWnH4slfW4: \
    -d amount=1000 \
    -d currency=usd \
    -d source=tok_FVUiueMlgtJ5si7grNKxaTdI \
    -d transfer_group=ORDER42
```

Create a Transfer (to a connected account) 211A

Transfer syntax:

```
Create a Transfer to the connected account (later):
curl https://api.stripe.com/v1/transfers \
    -u sk_test_BQoZykGUvBcI2HpWnH4slfW4: \
    -d amount=877 \
    -d currency=usd \
    -d destination="{CONNECTED_STRIPE_ACCOUNT_ID}" \
    -d transfer_group=ORDER42
```

| Create a Transfer 211B | Create a Transfer 211C | Create a Transfer 211D |

FIG. 2

Platform 310

Create a Charge 306

```
Charge syntax:
# Create a Charge:
curl https://api.stripe.com/v1/charges \
    -u sk_test_BQoZykGUvBcI2HpWnH4slfW4: \
    -d amount=5000 \
    -d currency=usd \
    -d source=tok_7u2Kpy0p04DvWCtL8QTnB4e0 \
    -d transfer_group="{ORDER10}"
```

Create a Transfer (to a connected account) 311A

```
First Transfer syntax:
# Create a Transfer to a connected account (later):
curl https://api.stripe.com/v1/transfers \
    -u sk_test_BQoZykGUvBcI2HpWnH4slfW4: \
    -d amount=3743 \
    -d currency=usd \
    -d destination="{CONNECTED_STRIPE_ACCOUNT_ID}" \
    -d transfer_group="{ORDER10}"
```

Create a Transfer (to a connected account) 311B

```
Second Transfer syntax:
# Create a second Transfer to another connected account
    (later):
curl https://api.stripe.com/v1/transfers \
    -u sk_test_BQoZykGUvBcI2HpWnH4slfW4: \
    -d amount=916 \
    -d currency=usd \
    -d destination="{OTHER_CONNECTED_STRIPE_ACCOUNT_ID}" \
    -d transfer_group="{ORDER10}"
```

FIG. 3

Platform 410

Create a constrained transfer (to a connected account) 411

```
Constrained Transfer syntax:
#curl https://api.stripe.com/v1/transfers \
    -u sk_test_BQoZykGUvBcI2HpWnH4slfW4: \
    -d amount=1000 \
    -d currency=usd \
    -d source_transaction="{CHARGE_ID}" \
    -d destination="{CONNECTED_STRIPE_ACCOUNT_ID}"
```

Platform 510

Refund 511

```
Refund syntax:
curl https://api.stripe.com/v1/refunds \
   -u sk_test_BQoZykGUvBcI2HpWnH4slfW4: \
   -d charge="{CHARGE_ID}"
```

FIG. 5B

Platform 510

Reversal 512

```
Reversal syntax:
curl https://api.stripe.com/v1/transfers/{TRANSFER_ID}/reversals \
   -u {PLATFORM_SECRET_KEY}: \
   -d amount=500
```

FIG. 7A

Platform 710

API Call 711

API call syntax:
```
curl https://api.stripe.com/v1/charges \
    -u sk_test_BQoZykGUvBcI2HpWnH4slfW4: \
    -d amount=1500 \
    -d currency=usd \
    -d source="{CONNECTED_ACCOUNT_ID}"
```

FIG. 7B

Platform 710

Authenticate 712

Authenticate syntax:
```
curl https://api.stripe.com/v1/transfers \
    -u sk_test_BQoZykGUvBcI2HpWnH4slfW4: \
    -H "Stripe-Account: {CONNECTED_ACCOUNT_ID}" \
    -d amount=1500 \
    -d currency=usd \
    -d destination="{PLATFORM_ACCOUNT_ID}"
```

SYSTEMS, METHODS, AND APPARATUSES FOR FACILITATING TRANSFERS BETWEEN USER COMMERCE ACCOUNTS ASSOCIATED WITH A MERCHANT OF A COMMERCE PLATFORM

CLAIM OF PRIORITY

This present patent application is a continuation of U.S. patent application Ser. No. 15/892,290, filed Feb. 8, 2018, entitled "SYSTEMS, METHODS, AND APPARATUSES FOR FACILITATING TRANSFERS BETWEEN USER COMMERCE ACCOUNTS ASSOCIATED WITH A MERCHANT OF A COMMERCE PLATFORM", and claims priority to provisional U.S. Utility Patent Application No. 62/456,564, filed on Feb. 8, 2017, entitled "Systems, Methods, and Apparatuses for Facilitating Transfers Between User Commerce Accounts Associated with a Merchant of a Commerce Platform," which is related to non-provisional U.S. Utility patent application Ser. No. 13/664,808, filed Oct. 31, 2012, entitled "Method for conducting a transaction between a merchant site and a customer's electronic device without exposing payment information to a server-side application of the merchant site," the entire contents of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

Embodiments relate generally to the field of electronic commerce within a computing infrastructure, and more particularly, to systems, methods, and apparatuses for facilitating transfers between user commerce accounts associated with a merchant of a commerce platform within a computing environment supported by a processor and a memory to execute such functionality. Such means may be implemented within the computing architecture of a hosted computing environment, sometimes referred to as an "on-demand" or a "cloud computing environment," through which clients, subscribers, users, and other parties may utilize the computing infrastructure of the payment system remotely, such as over the Internet.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to described embodiments.

Merchants looking to accept payments online or in applications (e.g., mobile apps) often must trade-off between having full control over their customers' experience and the amount of investment into computing infrastructure and customized software necessary to accept such payments. Some merchants minimize their investment by working with third parties to handle their payment needs. In these cases, the merchants typically redirect their customers to the third party, which is responsible for capturing the payment information and processing the transaction. The third party subsequently pays the merchants for successful transactions according to agreed terms.

While such an approach is often simple to implement, the merchant often lacks control over the user experience and very often this lack of control results in a poor user experience. Customers are redirected from the merchant site to the third-party site where they are often required to login or create a new account, causing confusion and customer abandonment. This flow also makes it difficult to handle changes to customer orders or to up-sell customers on new products subsequent to their primary purchase.

Conventionally, merchants seeking to have more control over payment flow features as well as their customers' user experience must invest significant time and money to build their own payment infrastructure.

Merchants may therefore create an account, referred to as a merchant's platform account, with a third-party merchant platform rather than creating their own payment infrastructure. Problematically, merchants seeking to utilize a third party existing commerce system are unable to create a charge within their own merchant's platform account and separately transfer funds to multiple connected accounts. This is because marketplace commerce systems are designed to flow funds in one direction—from a cardholder-payor to the platform, and from the platform to the merchant-payee.

In practice, many modern merchants are marketplaces where the purchase of a good or service may be comprised of multiple charges, and multiple transfers running in multiple directions. Consider for instance modern on-demand economy platforms, such as Postmates, which pay a restaurant and also pay a delivery provider as part of a single order or a single transaction or retail marketplaces, such as Amazon, which pay out to multiple different merchants for a single user's purchase of multiple items. There is a need to serve new business models having multiple charges and transfers, flowing in multiple directions, while increasing observability of the charges and transfers made on a third-party merchant platform.

The present state of the art may therefore benefit from the systems, methods, and apparatuses for facilitating transfers between user commerce accounts associated with a merchant of a commerce platform as is described herein. Embodiments which provide solutions to these and other deficiencies in the present state of the art are described herein.

SUMMARY OF THE INVENTION

Systems, methods and apparatuses for facilitating transfers between user commerce accounts associated with a merchant of a commerce platform are disclosed. In one embodiment, the method which is performed by a payment system having at least a processor and a memory therein to execute instructions, comprises creating a merchant platform account at the payment system, creating a single charge from a customer at the merchant platform account, creating multiple transfers from the merchant platform to different connected accounts where the multiple transfers are each to transfer a sub-portion of proceeds associated with the single charge from the customer to each of the different connected accounts, performing the single charge from the customer, and performing each of the multiple transfers from the merchant platform to the different connected accounts.

BRIEF DESCRIPTION OF THE DRAWINGS

Embodiments are illustrated by way of example, and not by way of limitation, and will be more fully understood with reference to the following detailed description when considered in connection with the figures in which:

FIG. 2 depicts a platform upon which a charge is created and subsequently one or more transfers are created to connected accounts;

FIG. 3 depicts an alternative charge creation and transfer creation where there is not a 1:1 correspondence between charges and transfers according to the depicted embodiment;

FIG. 4 depicts an alternative charge creation and transfer creation structure utilizing specified constraints according to the depicted embodiment;

FIG. 5A shows an embodiment in which a charge is refunded by a platform using that platform's secret key according to described embodiments;

FIG. 5B shows an embodiment in which a platform reverses a transfer, requiring the transfer ID, platform secret key, and the amount to be reversed;

FIG. 7A depicts an embodiment in which the platform charges a connected account, according to described embodiments;

FIG. 7B depicts an embodiment in which the platform authenticates a connected account, according to described embodiments.

DETAILED DESCRIPTION

Figure 1:
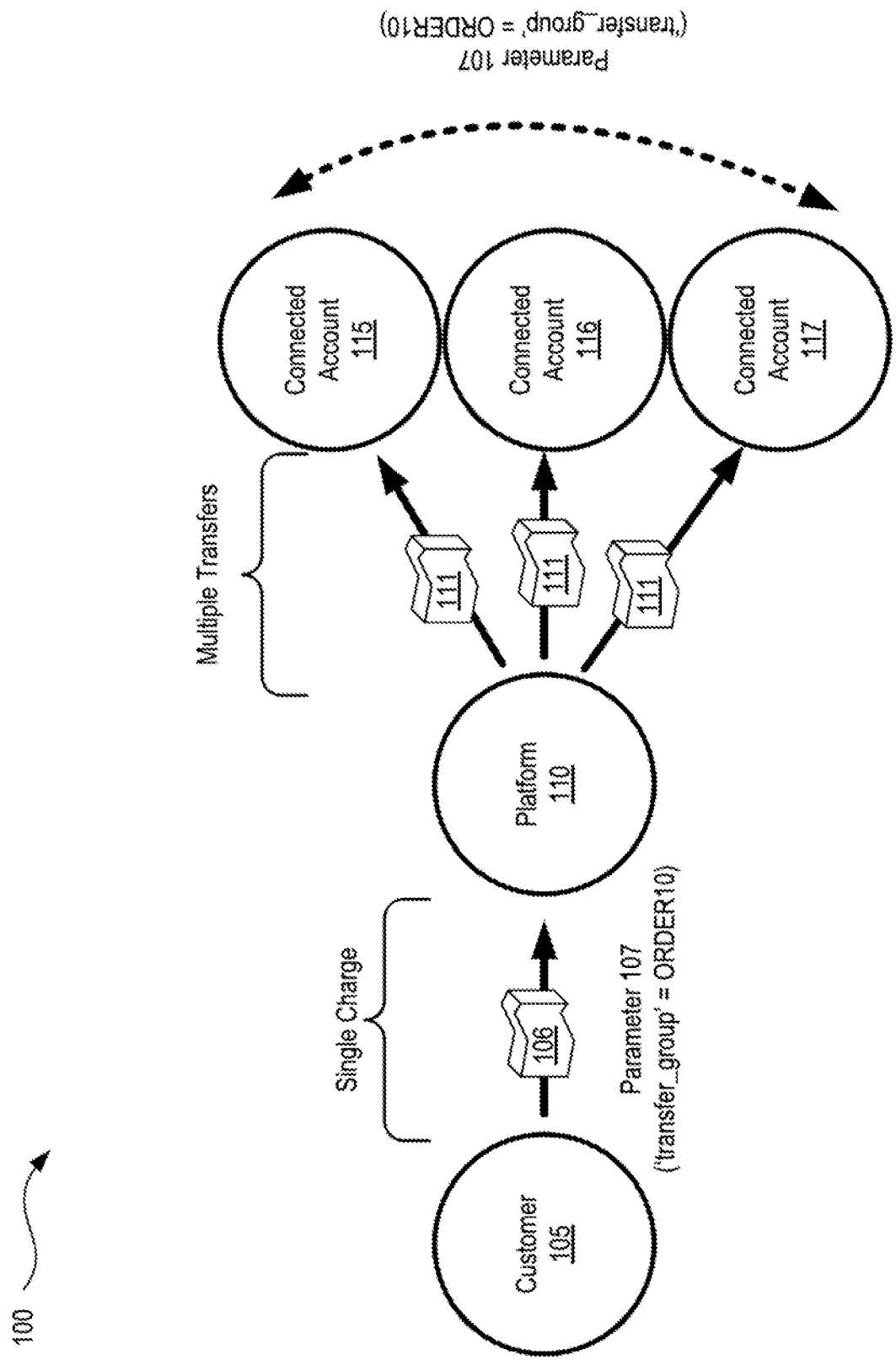
FIG. 1 depicts an exemplary payment data flow architecture in accordance with described embodiments.

Described herein are systems, methods, and apparatuses for facilitating transfers between user commerce accounts associated with a merchant of a commerce platform. An exemplary system may include, for example: a mechanism for creating a merchant platform account at the payment system; creating a single charge from a customer at the merchant platform account; creating multiple transfers from the merchant platform to different connected accounts, wherein the multiple transfers are to each transfer a sub-portion of proceeds associated with the single charge from the customer to each of the different connected accounts; performing the single charge from the customer; and performing each of the multiple transfers from the merchant platform to the different connected accounts.

Merchants, such as grocers, car services, dry cleaning services, etc., provide their products and services to consumers. Such merchants often employ independent professionals or agents to deliver their products and/or provide the actual services. For example, a person acting on the merchant's behalf will drive a consumer in their own car, deliver food ordered through a merchant website, pick up and/or drop off clothes dry cleaned by the merchant, etc.

These merchants, although providing a system for supplying products and/or services to consumers through their independent professionals, often do not perform the financial processing associated with the merchant transactions. Instead, merchants often utilize commerce systems provided by an independent third party to process financial transactions for the products and/or services provided to consumers through their agents or independent professionals. This may involve the merchant creating an account with the commerce system; this account may be referred to herein as a platform account. The independent professional or agent may establish an account with the merchant and/or an account with the commerce system, which may be referred to herein as a connected account. Once the accounts are established, the agent may then accept payments from customers of the merchant for provided products and/or services, and the commerce system processes the accepted payments.

Such processing may include running credit cards, crediting a merchant account for the transaction, crediting the agent responsible for the transaction, debiting a commerce system fee for processing the transaction on behalf of the merchant, as well as performing other commerce related transactions for the merchant and/or agent such as providing payouts for products/services rendered on behalf of a merchant.

Embodiments disclosed herein are described in the context of an online payment acceptance service called Stripe® commercialized by Stripe, Inc., of San Francisco, California. Certain terminology is used herein for convenience only and is not to be taken as a limitation of the below recited claims.

According to certain embodiments, described methods and systems are provided to create a charge on a platform account and separately transfer funds to multiple connected accounts. According to such embodiments, the commerce system may be Stripe Connect, operated by Stripe, Inc. of San Francisco, CA, and charges may be created utilizing the Stripe.js library, details of which can be found in U.S. Pat. No. 9,824,354, entitled "Method for conducting a transaction between a merchant site and a customer's electronic device without exposing payment information to a server-side application of the merchant site," the entire contents of which is incorporated herein by reference.

In accordance with the described embodiments, the following terms are defined in support of the detailed description that follows:

A Card Network (or Card Association)—refers to financial payment networks such as, for example, but not limited to, Visa®, MasterCard®, American Express®, Diners Club®, JCB® and China UnionPay®.

A "Processor" of payment card transactions, as opposed to a "processor" or a "Central Processing Unit (CPU)" of a computing device, refers to a company (often a third party) appointed to handle payment card transactions. Such Processors have connections to various payment card networks and supply authorization and settlement services to merchants or payment service providers. Processors may also move money from an issuing bank to a merchant or an acquiring bank. Such payment cards encompass debit cards, gift cards, credit cards, charge cards, and so forth.

Acquiring Bank (or acquirer) refers to a bank or financial institution that accepts payment card payments from affiliated card networks for products or services on behalf of a merchant or payment service provider.

A Card Issuing Bank (or issuer) refers to a bank that offers card network or association branded payment cards directly to consumers. An issuer assumes primary liability for the consumer's capacity to pay off debts they incur with their card.

Payment Information refers to a wide variety of information which may be associated with payment of funds from a payor to a payee including, for example, primary account number (PAN) or payment card number, card validation code, expiration month and year, Automated Clearinghouse (ACH) transaction data, bank routing number(s), account number(s) for a bank specified by a routing number, etc. The payment information may include sensitive, non-public information or may include publicly available information, or more commonly, both.

A merchant refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

A merchant site refers to an e-commerce site (e.g., a website) of the merchant where such products and services are licensed or sold. This may be implemented by implemented using one or more servers that collectively make up a merchant platform.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

FIG. 1 depicts an exemplary architecture 100 in accordance with described embodiments. In particular, there is depicted a customer 105 interacting with a platform 110 via the 'transfer_group'=ORDER10 single charge 106, from which funds associated with the customer's 105 single charge 106 or single transaction are distributed to multiple connected accounts via the multiple transfers 111 as depicted here.

According to such an embodiment therefore, several connected accounts (e.g., connected accounts 115, 116, and 117) each receive a transfer 111 from a single charge 106 made on the platform 110 account. For instance, the several connected accounts (115, 116, and 117) may each receive a transfer 111 pursuant to a single transaction or a single charge 106 conducted on the commerce platform 110 by the single customer 105 despite the fact that only one single original charge 106 occurred.

In this embodiment, the single charge 106 is created using the parameter 107 (shown here as 'transfer_group') which is given a value (e.g., an alphanumeric string) by the platform 110, in which the transfer_group parameter 107 has a value "ORDER10" as depicted here. The platform 110 may then create multiple transfers 111 using that same parameter value to track the underlying goods or services provided, rather than having multiple charges and multiple transfers with a 1:1 correspondence to the multiple original charges.

For instance, the single charge 106 and multiple transfers 111 depicted here have a 1:3 correspondence, though other ratios are permissible.

According to certain embodiments, the parameter provided as part of the originating transaction from the customer 105 may be linked to any number of charges and transfers.

According to described embodiments, creating the single charge 106 at the platform 110 includes specifying a value for the parameter using a string that is decipherable by to the platform's 100 underlying computing systems. For instance, the string 'transfer_group'=ORDER10 as depicted here may correspond to a determinable meaning at the platform's systems and may additionally be unique to a single grouping of charges and transfers, so as to better track the underlying goods or services provided.

FIG. 2 depicts a platform upon which a charge is created and subsequently one or more transfers are created to connected accounts.

For instance, as can be seen here, there is a platform 210, such as the commerce platform, and at element 206 a single charge is created via the charge syntax:

```
Create a Charge:
curl https://api.stripe.com/v1/charges \
    u sk_test_BQoZykGUvBcI2HpWnH4slfW4: \
    d amount=1000 \
    d currency=usd \
    d source=tok_FVUiueMlgtJ5si7grNKxaTdI \
    d transfer_group=ORDER42
```

As set forth above, in one embodiment, sk refers to the secret key of platform 201 and source refers to a single use token used by a customer when making the charge. These are described in more detail below.

Subsequently, at element 211A, there is provided syntax to create a transfer to a connected account, as follows:

```
Create a Transfer to the connected account (later):
curl https://api.stripe.com/v1/transfers \
    u sk_test_BQoZykGlivEcI2HpWnH4slfW4: \
    d amount=877 \
    d currency=usd \
    d destination="{CONNECTED_STRIPE_ACCOUNT_ID}" \
    d transfer_group=ORDER42
```

As shown by elements 211B, 211C, and 211D, multiple additional transfers may be created for the single charge created 206 on the platform 210.

According to the depicted embodiment, curl programming language is utilized in conjunction with Stripe.js, though other embodiments may include one or more alternative programming languages such as Ruby, Python, PHP, Java, Node, Go, etc.

According to such an embodiment, a charge 206 is first created for the platform 210 account having the exemplary secret key of 'sk_test_BQoZykGlivEcI2HpWnH4slfW4'. The currency is specified and the amount of the charge is provided in cents (i.e., amount=1000 is equivalent to $10.00). The charge is created using a parameter entitled 'transfer_group', which is customizable by the platform 210 as described in relation to FIG. 1. Subsequently, the platform 210 creates one or more transfers (e.g., any one or more of 211A, 211B, 211C, and 211D) to connected account(s), in which each connected account is identified using an account identifier for the 'destination' parameter.

The transfer(s) 211A, 211B, 211C, and 211D are then created using the same 'transfer_group' parameter value as was used in creating the charge 206.

In such a way, the initial charge(s) 206 and subsequent transfer(s) 211A, 211B, 211C, and 211D may be identified by their common 'transfer_group' parameter value strings and linked together for tracking and monitoring purposes.

While the exemplary code depicted here presents the charge creation 206 and transfer(s) 211A, 211B, 211C, and 211D together, there is no requirement that the transfers 211A, 211B, 211C, and 211D be created shortly after creation of the charge 206. For instance, there may be minutes, hours, days, weeks, months, etc., between the charge creation 206 and the creation of the transfer(s) 211A, 211B, 211C, and 211D, depending on the needs of the platform 210.

According to the depicted embodiment, the platform 210 need not transfer the same amount as the original charge, and can only transfer up to the platform's available account balance. According to such an embodiment, the destination connected account sees the transfer as a payment. This approach provides the flexibility but may require the platform 210 to implement additional logic, such as the use of transfer_group parameter as well as timing criteria specifying when transfers may be created based upon the available balance.

In certain embodiments when a platform creates charges 206 and separately creates one or more transfers 211A, 211B, 211C, and 211D, the platform 210 may earn money or collect a processing fee by transferring less than the total charged amount to the destination account(s). For instance, utilizing the code depicted at FIG. 2, the charge amount less the commerce system's fees is added to the platform's 210 account pending balance. When the platform's 210 available balance is sufficient (at least $8.77), the transfer can succeed, reducing the platform's available balance by that amount and increasing the connected account's available balance by that same amount; while the platform 210 retains an additional $0.64 ($10.00-$8.77-$0.59) as exemplary earnings or collected processing fees.

FIG. 3 depicts an alternative charge creation and transfer creation where there is not a 1:1 correspondence between charges and transfers according to the depicted embodiment.

More particularly, depicted here is a situation in which a platform 310 has a more complex business model, lacking a one-to-one relationship between charges 306 and transfers 311A and 311B as some platforms 310 may require.

Consider for example a ride sharing platform which may pay bonuses to its drivers which are not necessarily tied to any individual charge or alternatively, a delivery platform 306 which needs to pay both the business and the delivery person from a single charge 306.

Use of the depicted charge-and-separately-transfer approach does not require a one-to-one relationship between charges 306 and transfers 311A and 311B. As shown here, the 'transfer_group' parameter allows the platform 310 to define such complex relationships, including linking any number of charges 306 and transfers 311A and 311B, as well as, or alternatively, creating the charges 306 and transfers 311A and 311B in any order. In certain embodiments, the only restriction is that the 'transfer_group' parameter must represent a single business action and be unique to a single grouping of charges 306 and transfers 311A and 311B.

As shown here, the create a charge syntax 306 is as follows:
Create a Charge:
curl https://api.stripe.com/v1/charges \
u sk_test_BQoZykGUvBcI2HpWnH4slfW4: \
d amount=5000 \
d currency=usd \

As shown here, the create a transfer (to a connected account) 311A syntax for the first transfer is as follows:
Create a Transfer to a connected account (later):
curl https://api.stripe.com/v1/transfers \
u sk_test_BQoZykGUvBcI2HpWnH4slfW4: \
d amount=3743 \
d currency=usd \
d destination="{CONNECTED_STRIPE_ACCOUNT_ID}" \
d transfer_group="fORDER101"

As shown here, the create a transfer (to a connected account) 311B syntax for the second transfer is as follows:
Create a second Transfer to another connected account (later):
curl https://api.stripe.com/v1/transfers \
u sk_test_BQoZykGUvBcI2HpWnH4slfW4: \
d amount=916 \
d currency=usd \
d destination="{OTHER CONNECTED_STRIPE_ACCOUNT_ID}" \
d transfer_group="fORDER101"

According to described embodiments, the commerce system may provide a user interface (e.g., a dashboard) through which the platform 310 may search for certain charges 306 or transfers 311A and 311B. For instance, the user interface may permit queries to identify specific transfer groups.

FIG. 4 depicts an alternative charge creation and transfer creation structure utilizing specified constraints according to the depicted embodiment.

When creating separate charges and transfers 411, a platform 410 may inadvertently attempt a transfer without having a sufficient available balance. Doing so raises an error on the commerce system, and the transfer attempt therefore fails. According to certain embodiments, platforms 410 may utilize a separate constraint parameter to tie a transfer to an existing charge.

As depicted here, a 'source_transaction' parameter is utilized to tie a transaction to an existing charge, through the charge identifier or CHARGE_ID. By tying the transfer to an existing charge in such a manner, the transfer request succeeds regardless of the platform's available balance and the transfer itself only occurs once the charge's funds become available.

Consider the following syntax to create a constrained transfer to a connected account as depicted by element 411:
curl https://api.stripe.com/v1/transfers \
u sk_test_BQoZykGUvBcI2HpWnH4slfW4: \
d amount=1000 \
d currency=usd \
d source_transaction="{CHARGE_ID}" \
d destination="{CONNECTED_STRIPE_ACCOUNT_ID}"

Such embodiments may therefore impose constraints on the use of the 'source_transaction' parameter and equivalents thereof. For example, a constraint may be imposed such that the amount of the transfer must not exceed the amount of the source charge. Multiple transfers may be created with the same 'source_transaction', provided that the sum of the transfers does not exceed the source charge.

According to such embodiments, the transfer 411 takes on the pending status of the associated charge such that, if the funds from the charge become available in N days, the payment that the destination account receives from the transfer also becomes available in N days. The commerce system may itself, according to certain embodiments, create a 'transfer_group' parameter and value for the platform, although such a parameter need not be specified in accordance with other embodiments.

A platform 410 account may need to refund charges created on its platform. In embodiments, charges created on a platform may be refunded using that platform's 410 secret key, such secret key described in U.S. patent application Ser. No. 13/664,808, which is incorporated herein by reference in its entirety. Refunding a charge may have no impact on any associated transfers, in that in certain embodiments the platform must reconcile any amount owed back to the platform by reducing subsequent transfer amounts, or by reversing transfers (e.g., as shown in FIG. 5B).

FIG. 5A shows an embodiment in which a charge is refunded 511 by a platform 510 using that platform's secret key (here, sk_test_BQoZykGUvBcI2HpWnH4slfW4). In such embodiments, the fees paid to the commerce platform may be automatically—and proportionally—refunded when a charge is refunded.

Consider for instance the following refund syntax:
curl https://api.stripe.com/v1/refunds \
   u sk_test_BQoZykGUvBcI2HpWnH4slfW4: \
   d charge="{CHARGE_ID}"

FIG. 5B shows an embodiment in which a platform 510 reverses 512 a transfer, requiring the transfer ID, platform secret key, and the amount to be reversed.

A platform may need to reverse 512 transfers made to connected accounts, either entirely or partially, performed via the following exemplary syntax:
curl https://api.stripe.com/v1/transfers/{TRANSFER ID}/reversals\
   u {PLATFORM SECRET KEY}: \
   d amount=500

Transfer reversals 512 add the amount back to the platform's 510 available balance, reducing the connected account's available balance accordingly. In embodiments, the commerce system imposes a constraint such that it is only possible to reverse 512 a transfer if the connected account's available balance is greater than the reversal amount.

Figure 6:
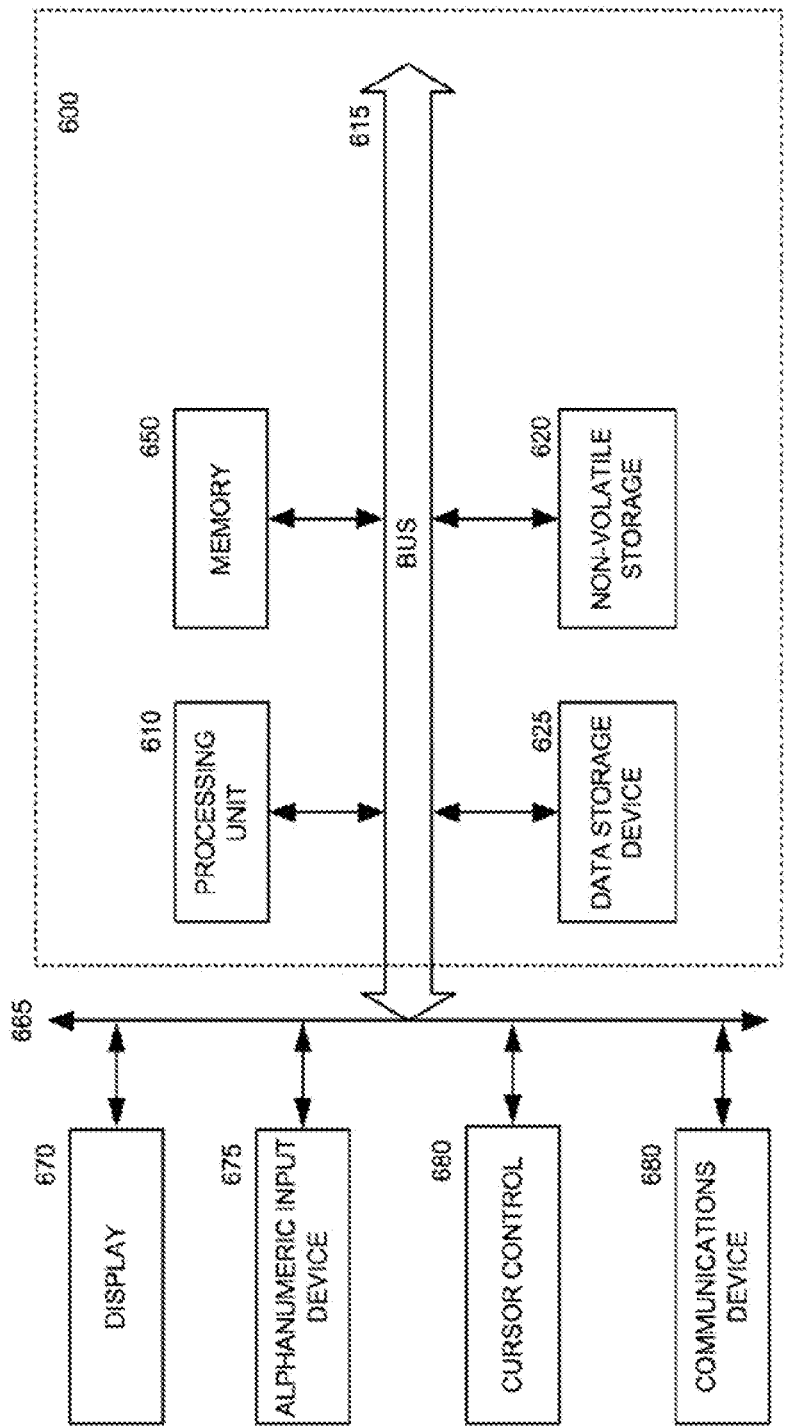
FIG. 6 depicts an embodiment of a computer system that may be used to support the systems and operations discussed herein.

FIG. 6 depicts an embodiment of a computer system 605 that may be used to support the systems and operations discussed herein. It will be apparent to those of ordinary skill in the art, however, that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

In certain aspects, a platform might need to transfer funds from its connected accounts to the platform account. Examples when such a need may arise include charging the connected account directly for products and services, recovering funds for a previous refund or chargeback, and making other adjustments to connected account balances (e.g., to correct an error). Embodiments are provided for the platform to debit a connected account to credit the platform account, in which a transfer is created on the connected account and payment is created on the platform account. In such embodiments, the commerce system may impose constraints as to which types of connected accounts can be supported, require that the currency of the debit match the default currency of the platform account, or other requirements.

FIG. 7A depicts an embodiment in which the platform charges a connected account, according to described embodiments.

As shown here, an API call 711 returns the payment created on the platform account, however, it does not return a charge.

This approach is useful for platforms 710 that charge their connected accounts for goods and services (e.g., for using the platform 710). For example, a platform 710 may charge its connected accounts for their subscriptions directly through their balance with the commerce system (e.g., Stripe), minimizing any need to collect an additional payment method and allowing for near instant availability of the funds. To help keep track of this additional revenue source, the commerce system may make sure this revenue is appropriately added to the right tax forms (e.g., 1099).

Consider the following exemplary API call 711 syntax:
curl https://api.stripe.com/v1/charges \
    u sk_test_BQoZykGUvEcI2HpWnH4slfW4: \
    d amount=1500 \
    d currency=usd \
    d source="{CONNECTED_ACCOUNT_ID}"

FIG. 7B depicts an embodiment in which the platform authenticates a connected account, according to described embodiments.

According to another embodiment, debiting a connected account includes making a transfer from the connected account to the platform account, as shown at FIG. 7B. In such an embodiment, the platform 710 can authenticate 712 as the connected account and provide the platform's account ID as the destination for the transfer, using the following exemplary syntax:
curl https://api.stripe.com/v1/transfers \
    u sk_test_BQoZykGUvEcI2HpWnH4slfW4: \
    H "Stripe-Account: {CONNECTED_ACCOUNT_ID}" \
    d amount=1500 \
    d currency=usd \
    d destination="{PLATFORM_ACCOUNT_ID}"

Such an API call 711 returns the transfer created on the connected account. This approach is useful for making adjustments within a platform (e.g., correcting a mispayment or recovering fees). Account debits created as transfers are not reported as revenue (i.e., do not appear on a 1099).

Figure 8:
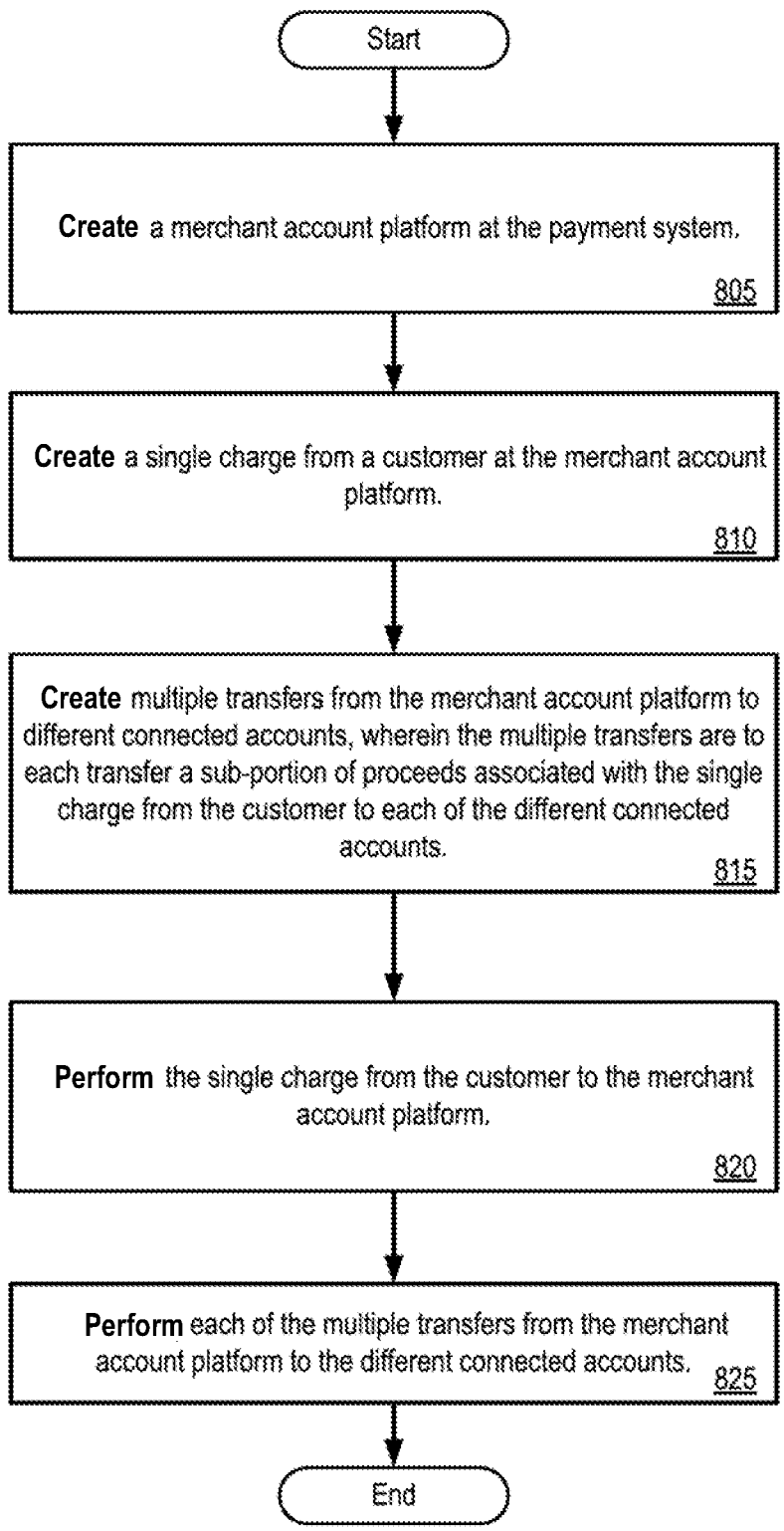
FIG. 8 depicts a flow diagram illustrating a method for facilitating transfers between user commerce accounts associated with a merchant of a commerce platform within a computing environment supported by a processor and a memory to execute such functionality according to described embodiments.

FIG. 8 depicts a flow diagram illustrating method 800 for facilitating transfers between user commerce accounts associated with a merchant of a commerce platform within a computing environment supported by a processor and a memory to execute such functionality according to described embodiments. Method 800 may be performed by processing logic that may include hardware (e.g., circuitry, dedicated logic, programmable logic, microcode, etc.), software (e.g., instructions run on a processing device) to perform various operations such as creating, receiving, performing, generating, associating, sending, splitting, inviting, transmitting, updating, presenting, interfacing, communicating, querying, processing, etc., in pursuance of the systems and methods as described herein. Some of the blocks and/or operations listed below are optional in accordance with certain embodiments. The numbering of the blocks presented is for the sake of clarity and is not intended to prescribe an order of operations in which the various blocks must occur.

With reference method 800, at block 805, processing logic creates a merchant account platform at the payment system.

At block 810, processing logic creates a single charge from a customer at the merchant platform account.

At block 815, processing logic creates multiple transfers from the merchant account platform to different connected accounts, wherein the multiple transfers are to each transfer a sub-portion of proceeds associated with the single charge from the customer to each of the different connected accounts.

At block 820, processing logic sending the single charge from the customer to the merchant account platform.

At block 825, processing logic performs each of the multiple transfers from the merchant account platform to the different connected accounts.

According to another embodiment of method 800, creating the single charge includes specifying the charge from the customer to the merchant account platform without performing the single charge and further in which performing the single charge includes debiting the proceeds specified by the charge from an account associated with the customer and depositing the proceeds specified by the charge into the merchant account platform.

According to another embodiment of method 800, creating the multiple transfers from the merchant account platform includes specifying each of a plurality of different transfers from the merchant account platform without performing any of the plurality of different transfers; and in which performing each of the multiple transfers includes transferring proceeds specified by each of the plurality of different transfers from the merchant account platform by debiting the proceeds from an account balance of the merchant account platform and depositing the proceeds specified by each of the plurality of different transfers into each of the different connected accounts as specified by each of the plurality of different transfers.

According to another embodiment of method 800, the merchant account platform earns revenue or collects fees by transferring less than a total amount of proceeds received at the merchant account platform pursuant to performing the single charge from the customer to the merchant account platform to each of the different connected accounts.

According to another embodiment, method 800 further includes: tracking the single charge and the each of the multiple transfers with a common specified transfer group parameter. According to such an embodiment, each of the single charge created and the multiple transfers created specify the common specified transfer group parameter.

According to another embodiment of method 800, the common specified transfer group parameter is customizable by the merchant account platform.

According to another embodiment of method 800, the common specified transfer group parameter is unique amongst a single group of charges and transfers.

According to a particular embodiment, there is a non-transitory computer readable storage media having instructions stored thereupon that, when executed by a processor of a payment system having at least the processor and a memory therein, the instructions cause the payment system to perform operations including: creating a merchant account platform at the payment system; creating a single charge from a customer at the merchant account platform;

creating multiple transfers from the merchant account platform to different connected accounts, wherein the multiple transfers are to each transfer a sub-portion of proceeds associated with the single charge from the customer to each of the different connected accounts; performing the single charge from the customer to the merchant account platform; and performing each of the multiple transfers from the merchant account platform to the different connected accounts.

AN EXAMPLE EMBODIMENT

Referring back to FIG. 1, in one embodiment, the transfer_group parameter is a text string added to communications to and from platform 110. These communications occur between customer 105 and platform 110, between platform 110 and connected accounts 115-117, and between platform 110 and the payment processor or an intermediary to the payment processor (e.g., Stripe).

In one embodiment, platform 110 makes communication requests. For example, platform 110 issues an API request for customer 105 and issues communications for the multiple transfers to connected accounts 115-117. As discussed above, the transfer_group parameter enables platform 110 to associate a charge with multiple transfers. In this manner, platform 110 is able to use the transfer_group parameter to maintain global knowledge of the manner in which a charge was handled including the transfers and associated payments related to that charge.

In one embodiment, the platform is a merchant platform or site. In one embodiment, the merchant is a service provider that responds to orders from customers by providing services that involve multiple communications with other parties that are needed to fulfill each order. For example, the merchant may receive orders for products and engage with multiple parties to complete the order. For example, in one embodiment, the merchant is a service provider that has a good or service purchased by from a third party and uses yet another party to deliver the goods or services to the customer. Postmates is an example of such a merchant/service provider.

Figure 9:
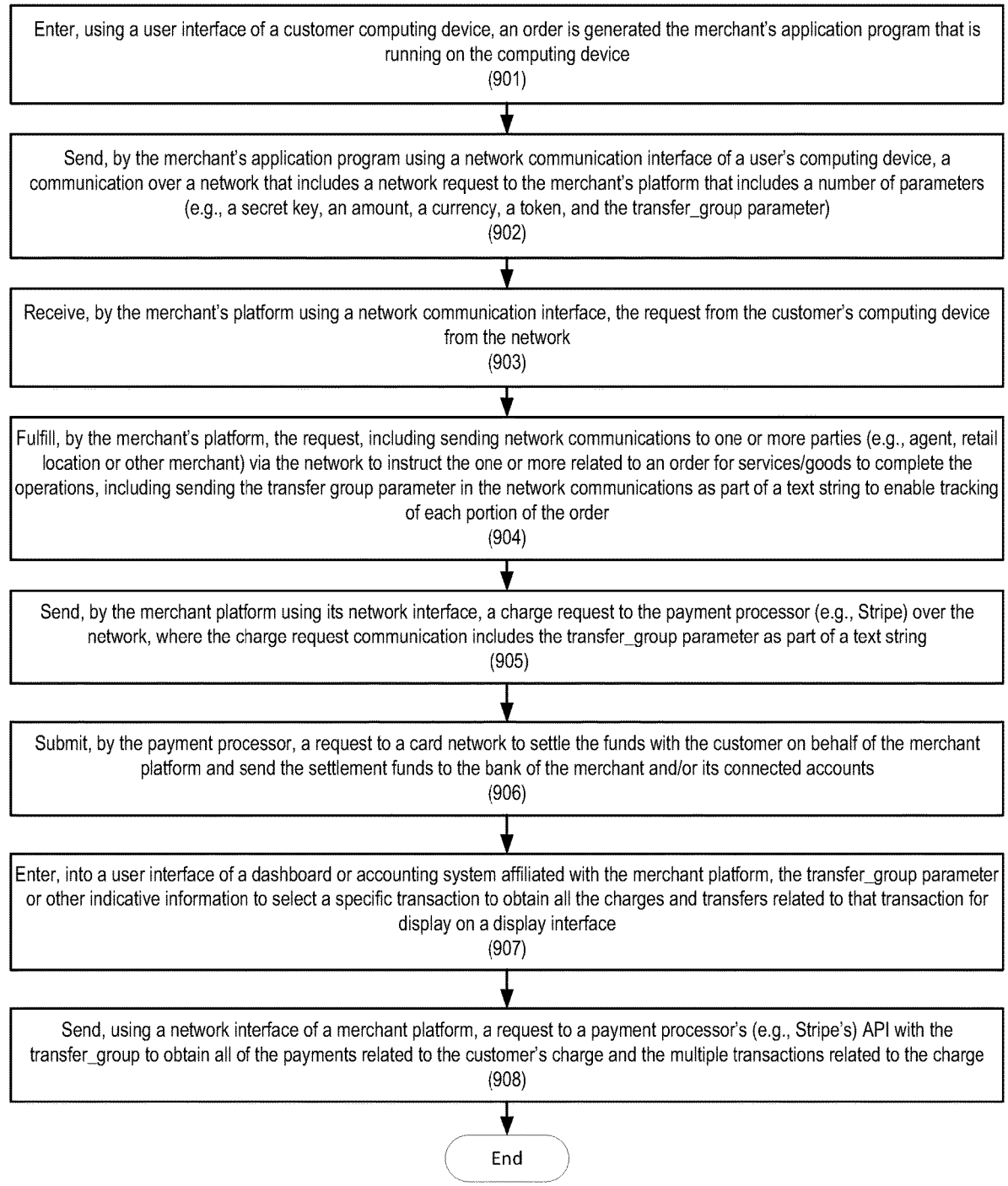
FIG. 9 is another flow diagram illustrating a method for facilitating transfers between user commerce accounts associated with a merchant of a commerce platform within a computing environment supported by a processor and a memory to execute such functionality according to described embodiments.

FIG. 9 illustrates one embodiment of a process for completing a charge using a platform, such as a merchant platform. The process may be performed by processing logic that may include hardware (e.g., circuitry, dedicated logic, programmable logic, microcode, etc.), software (e.g., instructions run on a processing device) to perform various operations such as creating, receiving, performing, generating, associating, sending, splitting, inviting, transmitting, updating, presenting, interfacing, communicating, querying, processing, etc., in pursuance of the systems and methods as described herein. Some of the blocks and/or operations listed below are optional in accordance with certain embodiments. The numbering of the blocks presented is for the sake of clarity and is not intended to prescribe an order of operations in which the various blocks must occur.

Referring to FIG. 9, the process begins with the customer (user) entering an order in a user interface that is generated the merchant's application program that is running on a computing device being used by a user. The user interface may be part of a browser. The computing device may be a mobile device (e.g., smart phone, laptop computer, tablet, etc.), desktop computer, etc. In one embodiment, the computing device is a device such as shown in FIG. 6 and described above.

In response to the order, the merchant's application program sends a communication over a network using the network interface of the computing device upon which the application program is executing. The communication includes a network request to the merchant's platform that includes a number of parameters. In one embodiment, the parameters include a secret key, an amount, a currency, a token, and the transfer_group parameter, such as set forth, for example, above in FIG. 2. In one embodiment, the platform generates the transfer_group parameter or otherwise provides an indication to the merchant's application program executing on the user's computing device as to which transfer_group to use. This may occur prior to its use as part of the network request.

The token that is included as one of the parameters may be generated in a number of ways, one of which is described in more detail below. Also, the use of the secret key that is included in the parameters is described in more detail below.

In one embodiment, the parameters of the request are combined into a single text string for communication over the network. In other words, order identification information is transformed into a text string that is incorporated into network request communications. This facilitates reconciliation when a merchant has large numbers of orders occurring which each have multiple transfers associated with them and payments are being handled by another party (e.g., Stripe).

In one embodiment, the merchant's platform receives, via a network communications interface, the request from the customer's computing device via the network using and proceeds to fulfill the request. In one embodiment, the request is related to an order for services and the merchant platform contacts one or more of their agents to complete the operations. For example, in one embodiment, the merchant platform contacts a delivery person and instructs them to proceed to a retail location, make a purchase and then deliver the purchase to a customer. In such a case, the platform is used to facilitate paying the delivery person, the retail location and process the payment from the customer using a payment processor. In one embodiment, the delivery person and the retail location have connected accounts with the merchant platform, such as described above.

In one embodiment, the merchant platform communicates with its agents and other parties helping fulfil the customer's order using network communications and each of the communications uses the transfer_group parameter as part of a text string to enable tracking of each portion of the order (transaction).

As part of completing the order, the payment is processed. In this case, the merchant platform sends a charge request to the payment processor (e.g., Stripe) over the communication network using its network interface. The communication includes the transfer_group parameter as part of a text string. In response thereto, the payment processor submits a request to a card network to settle the funds with the customer on behalf of the merchant platform. The payment processor also sends the settlement funds to the bank of the merchant and/or its connected accounts as described above.

In one embodiment, a (merchant) network interface of the merchant platform receives input(s) to create a single charge from a customer at the merchant account platform and to create multiple transfers from the merchant account platform to different connected accounts, wherein the multiple transfers are to each transfer a sub-portion of proceeds associated with the single charge from the customer to each of the different connected accounts. A transaction engine of the merchant platform performs the single charge from the customer to the merchant account platform and performs each of the multiple transfers from the merchant account platform to the different connected accounts. In one embodiment, the network interface and the transaction engine are part of platform 110 of FIG. 1.

Thus, as described above, the merchant platform and/or the payment processor sends multiple transfers using the transfer_group parameter. Because the original charge and the subsequent transfers include the transfer_group parameter, they can be stored and easily searched. For example, the merchant platform may have a user interface on a dashboard or accounting system that allows entry of the transfer_group parameter or other indicative information to select a specific transaction and all the charges and transfers related to that transaction can be obtained using that information and displayed on a display interface of or attached to the merchant platform. Also, the merchant platform can hit the payment processor's (e.g., Stripe's) API with the transfer_group to obtain all of the payments related to the customer's charge and the multiple transactions related to the charge.

Thus, the merchant platform causes a transfer_group string to be attached to a charge and its related multiple transfers that ties the notion of a charge to the notion of an order and the notion of an order to the payment processor's notion of a charge, thereby enabling all inflows and outflows to be tracked. This tracking facilitates reconciliation, particularly in cases where the customer may perform multiple orders, which create multiple charges with multiple transfers related to each charge.

Processing Payments with the Use of Tokens and Secret Keys

Figure 10:
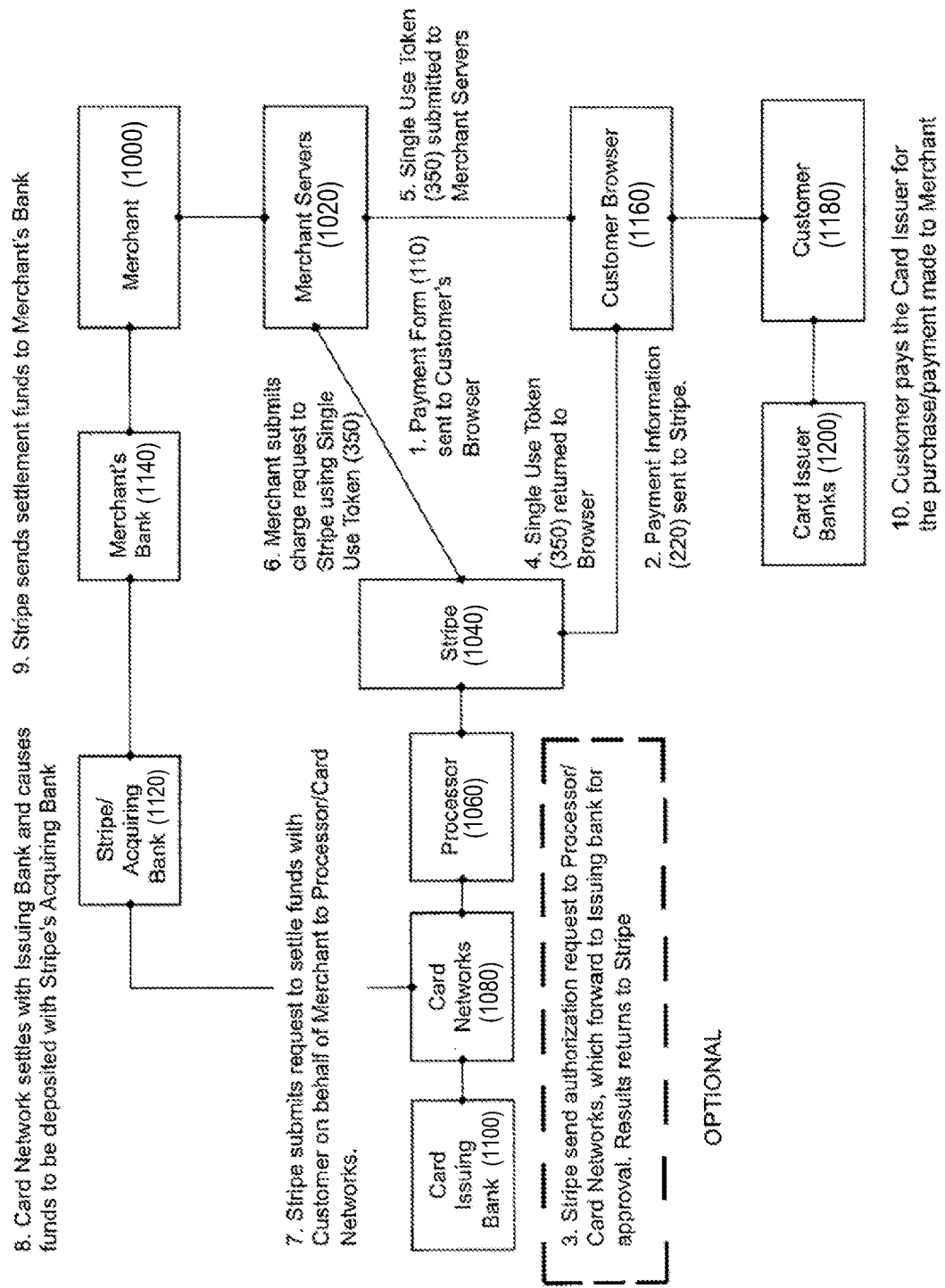
FIG. 10 is a data flow diagram of a one embodiment of a method for processing payments.

FIG. 10 is a data flow diagram of a one embodiment of a method for processing payments. In one embodiment, payment processing uses Stripe.js, which provides merchants with a set of technologies that can be easily and quickly integrated to securely accept payments online. With Stripe.js, merchants retain full control of their customers' payment flows but their servers are never exposed to sensitive payment information.

When added to a merchant's payment form, Stripe.js automatically intercepts the payment form submission, sending payment information directly to Stripe and converting it to a single-use token. The single-use token can be safely passed to the merchant's systems and used later to charge customers. Merchants have complete control of their customer's payment experience without ever handling, processing, or storing sensitive payment information.

At a high level, Stripe.js works as follows (FIG. 10).

1. The merchant's customer 1180 uses an internet-enabled browser 1160 to visit the merchant's site. Customer 1180 is served a Stripe.js enabled payment form 110 using standard web technologies. Customer 1180 enters the necessary information including their payment information and submits the payment form. The billing information portion of the payment form is for payment via a credit card or debit card. If payment is to be made via an Automated Clearinghouse (ACH) transaction, the billing information portion of the payment form will request a bank routing number and an account number within that bank, and possibly additional information, such as the bank name and whether the account is a checking or savings account.

2. The customer's payment information is sent from the customer's browser 1160 to Stripe 1040, never touching the merchant's servers 1020, which in one embodiment implement the merchant platform discussed above. In this manner, the client-side application electronically sends payment information retrieved from the customer's electronic device to the payment processor. The client-side application does not send payment information 220 to the server-side application. Note that prior to receiving the customer payment information, the merchant set up an account at Stripe 1040 to enable to the merchant platform to perform the operations described herein and have payments processed. In one embodiment, this occurs using an administrative interface at the merchant's platform.

3. In one embodiment, Stripe 1040 submits the relevant transaction to a processor 1060 or directly to the card network 1080 for authorization or validation of the payment information. Card network 1080 sends the request to card issuing bank 1100, which authorizes the transaction. In this embodiment, Stripe 1040 and processor 1060/card network 1080 function together as a payment processor. In another embodiment, this operation is performed without any communication to processor 1060/card network 1080. Instead, Stripe 1040 performs its own authorization or validation of the payment information using heuristic means, such as by checking the Bank Identification Number (BIN), also referred to as the Issuer Identification Number (IIN), against a database of known valid BINs that is on file with Stripe 1040. (The BIN is a part of the bank card number, namely the first six digits.) In yet another preferred embodiment, this step is not performed at all since the authorization or validation is not necessary for the next step 4 to succeed. That is, it is acceptable to create a single-use token in step 4 that represents payment information which has not been validated in any way.

4. If authorized, Stripe 1040 will generate and return a secure, single-use token 350 to customer's browser 210 that represents the customer's payment information 220 but doesn't leak any sensitive information. In one embodiment wherein step 3 is not performed, Stripe 1040 performs this step without waiting to receive authorization from processor 1060 or the card network 1080. In this manner, the payment processor (here, Stripe 1040) creates token 350 from the payment information sent by the client-side application, wherein the token 350 functions as a proxy for payment information 220.

5. Payment form 110 is submitted to merchant servers 1020, including single-use token 350. More specifically, the payment processor sends token 350 to the client-side application, which, in turn, sends token 350 to the server-side application for use by the server-side application in conducting the transaction.

6. The merchant 100 uses single-use token 350 to submit a charge request to Stripe 1040 (or to create a customer object for later use). In this operation, Stripe 1040 submits a request to authorize the charge to processor 1060 or directly to card network 1080. This authorization specifies the actual amount to charge the credit card. If an authorization was already done in step 3 for the correct amount, this authorization request can be skipped. This may be a one-time payment for a merchant item, or it may involve registering the payment information with the merchant site for subsequent use in making a payment for a merchant item (so-called "card on file" scenario). Using the process described in steps 1-6, the payment information can be used by the server-side application via token 350 without the server-side application being exposed to the payment information.

7. Stripe 1040 settles the charge on behalf of merchant 1000 with processor 1060 or directly with card network 1080.

8. Card network 1080 causes the funds to be paid by card issuing bank 1100 to Stripe 1040 or to Stripe's acquiring bank 1120.

9. Stripe 1040 causes the settled funds to be sent to merchant 1000 (or to the merchant's bank 1140), net of any applicable fees.

10. Card issuing bank 1100 collects the paid funds from customer 1180.

Note that Stripe 1040 may use operations depicted above to pay one or more of parties having the connected accounts described above.

Not all of the operations listed above must occur in real-time. Typically, when the merchant's customer submits the payment form in step 1, steps 1 through 6 happen in real-time and steps 7-10 happen later, usually once per day, as a batch process settling all of the funds for all of Stripe's merchants.

In one embodiment, the payment processor uses an http-based tokenization API for use in steps 2 and 4 above.

In one embodiment, when using Stripe.js on the client-side, a payment form is set up to use Stripe.js by the merchant. The merchant creates a payment form that will be presented to their customers when payment is required. In one embodiment, the input fields of the payment form representing sensitive payment data do not have a "name" attribute. This prevents them from hitting the merchant's servers when the payment form is submitted.

In a separate script tag, the merchant includes their publishable key, which identifies the merchant when communicating with Stripe.

In one embodiment, the merchant also adds an event handler to the payment form to capture the submit event. This stops the payment form from being submitted to the merchant's server, while it waits for Stripe to tokenize the payment information.

In one embodiment, j Query's val( ) is used to retrieve values entered in the payment form. Using j Query isn't necessary and standard Document Object Model (DOM) methods may alternatively be used to retrieve card data from the payment form.

In one embodiment, to create a token, in the event handler, a call converts the payment information to a single-use token that the merchant can then safely pass to their servers to charge their customer. In one embodiment, this call is an asynchronous call that returns immediately and invokes a handler when it receives a response from Stripe.

If the single-use token is created successfully, the single-use token is returned and added to the payment form and the form is submitted to the merchant's server.

In order to add the single-use token to the information submitted to the merchant's server, in one embodiment, a new input tag is added into the payment form, and its value is set to the identifier (ID) of the single-use token.

After the single-use token is added to the payment form, it posts the form data, without payment information, to the merchant's servers. In one embodiment, the data is sent as an HTTP POST to the URL in the form's action.

The API Tunnel above is used to allow the merchant's client-side application to create a token on Stripe's server. Since the merchant's client-side application is served from a different host than the one on which Stripe's API resides, the communication between the client-side application and Stripe's API is considered cross-origin communication. Cross-origin communication in an AJAX call is not permitted by most browsers. The API Tunnel is one way to enable this since browsers do allow ways to communicate between iframes served from different hosts, and each iframe can communicate with the host it was served from. It is, however, not the only way to achieve cross-origin communication. An alternative approach is to create the token using a JSONP request. Using a JSONP request simplifies the implementation because there is no need to serve up an API tunnel. The host can simply create the token by making a direct call to Stripe's API using AJAX. The call then specifies a callback function to be called with the result of the call. When using JSONP, the API needs to support creating tokens on GET requests instead of just POST requests.

In one embodiment, the token is created as part of form submission that includes setting up a communication pathway to the payment processor as part of the cross-origin communication in response to starting submission of the form from a client-side application of a computing device of a customer to a server-side application executing on the merchant platform, generating the token using payment information from the customer, and sending, without further user action, the token received from the payment processor to the server-side application as part of completing submission of the Charge to the server-side application.

Once sent to the customer's browser, the response handler adds the single-use token to the payment form and submits it, without the payment information, to the merchant's servers. In one embodiment, the data is sent as an HTTP POST to the URL in the form's action.

As discussed above, in the embodiment wherein Stripe performs its own verification, no communication will occur between the Stripe API Server and the processor to perform the verification.

Using the process described above, the payment processor (Stripe) enforces a rule that prevents a previously used token from being used for another transaction.

To one embodiment, in the process described above, the payment processor (Stripe) stores a set of valid publishable (non-secret) keys, and there is a non-secret key associated with the merchant site. The non-secret key is sent by the client-side application to the payment processor with the payment information. The payment processor compares the non-secret key received from the client-side application to the set of valid non-secret keys, and creates the token only if the non-secret key received from the client-side application is a valid non-secret key. Furthermore, in one embodiment, the non-secret key is restricted by the payment processor to only being used for creating the token.

As further described below, the payment processor (Stripe) also stores a set of valid secret keys, and there is a secret key associated with the merchant site. The server-side application sends the token and the secret key to the payment processor to conduct the transaction. The payment processor prevents authorization of the transaction if the secret key is not a valid secret key, or if the secret key is not associated with the merchant site that is associated with the token.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Some portions of the detailed description described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "initiating", "receiving", "validating", "aggregating", "directing", "redirecting", "associating", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various computing systems may be specifically adapted and configured for use with the teachings described herein, or specialized computing apparatuses may be constructed to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a payment system having at least a processor and a memory therein to execute instructions, wherein the method comprises:
    receiving an order, by a merchant platform account at a payment system, directly from a user device of a customer;
    associating a customer charge with the order, the customer charge comprising a common specified transfer group parameter;
    creating a set of transfers from the merchant platform account to a set of connected accounts using a set of parameters that include the common specified transfer group parameter, a secret key, and a single-use token, the single-use token associated with a merchant platform and generated using payment information from the customer, wherein the customer charge and the set of transfers are identifiable by the common specified transfer group parameter and linked together for tracking a service associated with the customer charge and the set of transfers;
    performing the customer charge from the customer to the merchant platform account using the single-use token and the secret key, in response to a determination that the secret key is valid and is associated with the merchant platform; and
    electronically transmitting a portion of proceeds associated with each of the set of transfers from the merchant platform account to each account of the set of connected accounts to perform the service associated with the customer charge and the set of transfers.

2. The method of claim 1, further comprising refunding the customer charge, wherein the refunding comprises: reversing the set of transfers from the merchant platform account to each of the set of connected accounts, wherein an instruction to perform the reversing comprises the single-use token and the common specified transfer group parameter.

3. The method of claim 2, wherein the refunding further comprises proportionally refunding fees paid to the payment system.

4. The method of claim 1, wherein creating the customer charge comprises specifying the customer charge from the customer to the merchant platform account without performing the customer charge, and further wherein performing the customer charge comprises debiting the proceeds specified by the customer charge from an account associated with the customer and depositing the proceeds specified by the customer charge into the merchant platform account.

5. The method of claim 1, wherein performing each of the set of transfers comprises transferring the proceeds specified by each of the set of transfers from the merchant platform account by debiting the proceeds from an account balance of the merchant platform account and depositing the proceeds specified by each of the set of transfers into each of the set of connected accounts as specified by each of the set of transfers.

6. The method of claim 1, wherein the merchant platform account earns revenue or collects fees by transferring less than a total amount of the proceeds received at the merchant platform account pursuant to sending the customer charge from the customer to the merchant platform account to each of the set of connected accounts.

7. The method of claim 1, further comprising tracking the customer charge and the each of the set of transfers with the common specified transfer_group parameter.

8. The method of claim 7, wherein the common specified transfer group parameter is customizable by the merchant platform account.

9. The method of claim 7, wherein the common specified transfer group parameter is unique amongst a single group of charges and transfers.

10. A non-transitory computer readable storage media having instructions stored thereupon that, when executed by a processor of a payment system having at least the processor and a memory therein, the instructions cause the payment system to perform operations comprising:
receiving an order, by a merchant platform account at the payment system, directly from a user device of a customer;
associating a customer charge with the order, the customer charge comprising a common specified transfer group parameter;
creating a set of transfers from the merchant platform account to a set of connected accounts using a set of parameters that include the common specified transfer group parameter, a secret key, and a single-use token, the single-use token associated with a merchant platform and generated using payment information from the customer, wherein the customer charge and the set of transfers are identifiable by the common specified transfer group parameter and linked together for tracking a service associated with the customer charge and the set of transfers;
performing the customer charge from the customer to the merchant platform account using the single-use token and the secret key, in response to a determination that the secret key is valid and is associated with the merchant platform; and
electronically transmitting a portion of proceeds associated with each of the set of transfers from the merchant platform account to each account of the set of connected accounts to perform the service associated with the customer charge and the set of transfers.

11. The non-transitory computer readable storage media of claim 10, further comprising refunding the customer charge, wherein the refunding comprises: reversing the set of transfers from the merchant platform account to each of the set of connected accounts, wherein an instruction to perform the reversing comprises the single-use token and the common specified transfer group parameter.

12. The non-transitory computer readable storage media of claim 11, wherein the refunding further comprises proportionally refunding fees paid to the payment system.

13. The non-transitory computer readable storage media of claim 10, wherein creating the customer charge comprises specifying the customer charge from the customer to the merchant platform account without performing the customer charge, and further wherein performing the customer charge comprises debiting the proceeds specified by the customer charge from an account associated with the customer and depositing the proceeds specified by the customer charge into the merchant platform account.

14. A payment system, comprising:
a memory to store instructions;
a processor to execute the stored instructions;
a merchant interface to receive an order, directly from a user device of a customer, at the payment system;
a transaction engine to associate a customer charge with the order, the customer charge comprising a common specified transfer group parameter;
the transaction engine further to create a set of transfers from a merchant platform account to a set of connected accounts using a set of parameters that include the common specified transfer group parameter, a secret key, and a single-use token, the single-use token associated with a merchant platform and generated using payment information from the customer, wherein the customer charge and the set of transfers are identifiable by the common specified transfer group parameter and linked together for tracking a service associated with the customer charge and the set of transfers;
the transaction engine further to perform the customer charge from the customer to the merchant platform account using the single-use token and the secret key, in response to a determination that the secret key is valid and is associated with the merchant platform; and
the transaction engine further to electronically transmit a portion of proceeds associated with each of the set of transfers from the merchant platform account to each account of the set of connected accounts to perform the service associated with the customer charge and the set of transfers.

* * * * *